US007395776B2

(12) United States Patent
Harruna

(10) Patent No.: US 7,395,776 B2
(45) Date of Patent: Jul. 8, 2008

(54) ROAD SAFETY SYSTEM AND METHODS OF USE THEREOF

(76) Inventor: Issifu I Harruna, 3310 Waterford Way, Conyers, GA (US) 30012

( * ) Notice: Subject to any disclaimer, the term of this patent is extended or adjusted under 35 U.S.C. 154(b) by 0 days.

(21) Appl. No.: 11/456,470

(22) Filed: Jul. 10, 2006

(65) Prior Publication Data

US 2008/0006199 A1 Jan. 10, 2008

(51) Int. Cl.
*B60Q 1/30* (2006.01)

(52) U.S. Cl. ........................ 116/28 R; 116/63 P; 160/10

(58) Field of Classification Search ............... 116/28 R, 116/63 P, 63 R; 40/514, 417, 590, 591, 601, 40/603, 604, 471, 515, 517, 612; 160/10, 160/24

See application file for complete search history.

(56) References Cited

U.S. PATENT DOCUMENTS

| | | | | |
|---|---|---|---|---|
| 2,997,573 | A | 8/1961 | Nyborg | |
| 3,255,725 | A * | 6/1966 | Von Kreidner et al. | 116/28 R |
| 3,430,374 | A * | 3/1969 | Woodard | 40/591 |
| 3,482,820 | A * | 12/1969 | Angello | 256/64 |
| 3,512,288 | A * | 5/1970 | Hall | 40/590 |
| 3,594,938 | A * | 7/1971 | Mosch | 40/591 |
| 3,949,503 | A * | 4/1976 | Waress | 40/591 |
| 4,292,751 | A * | 10/1981 | Snyder, Jr. | 40/517 |
| 4,552,089 | A | 11/1985 | Mahoney | |
| 4,720,135 | A * | 1/1988 | Farina | 296/136.03 |
| 4,817,318 | A * | 4/1989 | Strauch | 40/610 |
| 4,952,910 | A | 8/1990 | Straten et al. | |
| 5,022,700 | A * | 6/1991 | Fasiska et al. | 296/98 |
| 5,068,654 | A | 11/1991 | Husher | |
| 5,349,772 | A * | 9/1994 | Pardue | 40/590 |
| 5,398,437 | A | 3/1995 | Bump, Jr. et al. | |
| 5,438,780 | A * | 8/1995 | Winner | 40/514 |
| 5,577,824 | A | 11/1996 | Wright | |
| 5,775,253 | A | 7/1998 | Quan et al. | |
| 6,037,866 | A | 3/2000 | Leibowitz | |
| 6,038,800 | A * | 3/2000 | Seidel | 40/517 |
| 6,480,115 | B2 | 11/2002 | Ghahramani | |
| 6,648,170 | B1 * | 11/2003 | Watson | 221/1 |
| 6,779,537 | B1 * | 8/2004 | Miller | 135/117 |
| 6,963,275 | B2 | 11/2005 | Smalls | |
| 6,969,185 | B1 | 11/2005 | Adair | |
| 7,164,352 | B2 * | 1/2007 | Nelson | 340/472 |
| 7,168,195 | B1 * | 1/2007 | Seidel | 40/517 |
| 7,171,773 | B2 * | 2/2007 | Haggard, Jr. | 40/591 |
| 2004/0025391 | A1 * | 2/2004 | Storm | 40/591 |
| 2005/0046596 | A1 | 3/2005 | Nelson | |
| 2005/0081413 | A1 * | 4/2005 | Ko | 40/514 |
| 2007/0044359 | A1 * | 3/2007 | Worley | 40/590 |

FOREIGN PATENT DOCUMENTS

| | | | |
|---|---|---|---|
| GB | 2291670 | A * | 1/1996 |
| WO | WO 9801627 | A1 * | 1/1998 |

* cited by examiner

*Primary Examiner*—R. A. Smith
(74) *Attorney, Agent, or Firm*—Gardner Groff Greenwald & Villanueva, PC

(57) ABSTRACT

Described herein is a road safety warning system and methods of use thereof. The warning system includes a housing; a warning sign comprising a first end and a second end; and a means for extending and retracting the warning sign from the housing, wherein one or more wheels are attached to the second end of the warning sign. The warning sign can be extended from a disabled vehicle or mount in order to warn oncoming traffic.

13 Claims, 6 Drawing Sheets

ROAD SAFETY SYSTEM AND METHODS OF USE THEREOF

BACKGROUND

When a vehicle stops or breaks down along the side of a highway, a hazardous condition is created. The vehicle is either repaired or abandoned near the side of the highway as oncoming motorists continue to speed by. A number of safety devices have been devised that give oncoming motorists an early warning as to the road hazard created by such a breakdown.

Among the types of warning devices commonly used are standard highway safety triangles. These safety triangles are reflective and include a lower base and an upper, frequently collapsible, triangular-shaped device. The triangle is a well-known safety or hazard warning symbol. In many states, it is a legal requirement that trucks be equipped with such deployable safety triangles for use during a breakdown or an accident to warn oncoming motorist of the approaching hazard.

There is also a concern for the safety of the driver of the disabled vehicle when placing the safety triangles along the highway. The driver is placing himself at a heightened risk in order to position the safety triangles behind the disabled vehicle. In addition, the safety triangles may be knocked over after being placed on the ground due to strong winds or due to a passing motorist driving too close to the safety triangles. Therefore, what is needed is a safety warning system that can be easily deployed and provide ample warning to oncoming traffic.

SUMMARY

Described herein is a road safety warning system and methods of use thereof. The safety warning system has numerous applications such as, for example, alerting oncoming traffic that a vehicle has stopped or become disabled. The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate several aspects described below. Like numbers represent the same elements throughout the figures.

DETAILED DESCRIPTION

Before the present compounds, compositions, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

Described herein is a safety warning system. In one aspect, the safety warning system comprises:

a housing;

a warning sign comprising a first end and a second end; and a means for extending and retracting the warning sign from the housing.

Figure 1:
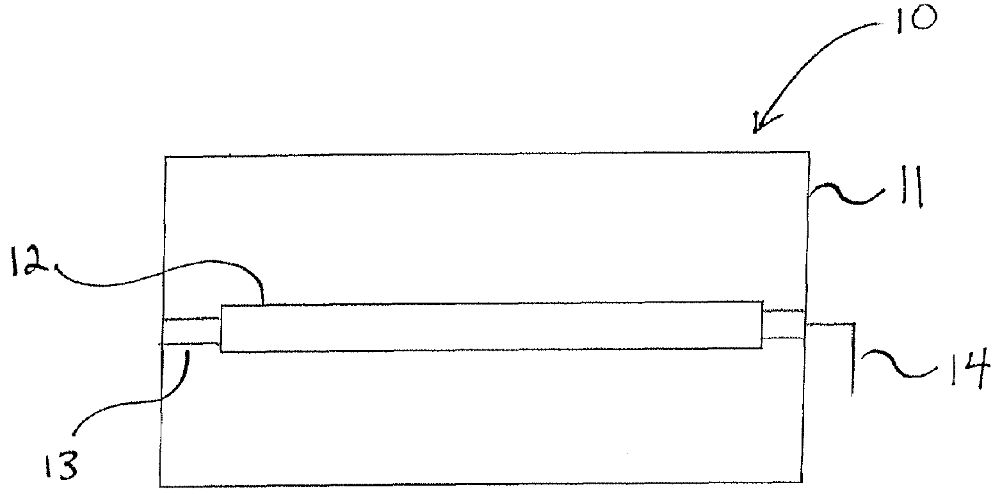
FIG. 1 shows a front view of one embodiment of the device, where the front side of the housing is removed showing the inner mechanics of the device.

Referring now to the drawings, wherein reference numerals represent like parts throughout, FIG. 1 shows the front-open view of the housing 11 of the system 10. Within the housing is a reel 12 that rotates about the shaft 13. The reel is capable of rotating clockwise and counter-clockwise to retract and extend the warning sign to/from the housing. The attachment of the warning sign to the reel will be discussed below. The rotation of the reel can be performed manually or mechanically. Referring to FIG. 1, the crank 14 is attached to the shaft 13, so that the reel can be rotated manually. In certain aspects, the reel is in a locked position to prevent the warning sign from extending from the housing. In one aspect, a brake system is in contact with the reel or shaft to prevent rotation about the reel. In this aspect, a release button or knob located on the external surface of the housing can be pushed or rotated, respectively, to lift the brake from the reel or shaft, which permits free rotation of the reel. If the reel is rotated manually (e.g., by a crank), the reel can be locked into place by the brake system once the warning sign has been retracted into the housing by pushing the release button or rotating the knob.

Figure 2:
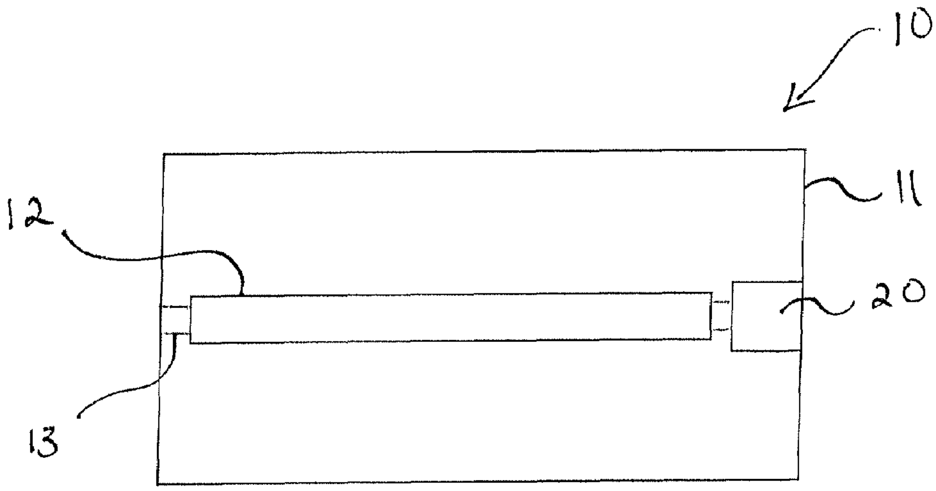
FIG. 2 shows a front view of another embodiment of the device, where the front side of the housing is removed showing the inner mechanics of the device.

Referring to FIG. 2, the shaft 13 can be attached to a motor 20, which can rotate the reel clockwise and counter-clockwise. It is contemplated that the motor can be battery operated (e.g., car battery or handheld batteries) or by a generator present in the vehicle. A knob can be present on the external surface of the housing to turn the motor on and off as well as the direction of rotation of the reel. In the alternative, the motor can be operated remotely. For example, the motor can be activated from the inside of the vehicle, where the motor is wired to the electrical system of the vehicle and controlled from within the vehicle. In another aspect, the motor can be operated by a wireless hand-held remote control. In these aspects, the driver does not need to leave the vehicle to extend the warning sign from the safety system, which can provide significant safety to a driver particularly on a busy highway. It is also contemplated that the brake system described above can be locked/unlocked remotely using the systems described above.

In another aspect, the mechanism used to lock shades and projection screens in place can be used to lock the extended warning sign. This mechanism generally involves a tension spring in the reel, wherein when the reel is pulled to a certain point, the reel is locked into position. When the warning sign is further extended from the locked position, the locking mechanism is released, and the warning sign is retracted back into the housing.

The housing 11 can be made of any durable material such as, for example, plastic, fiberglass, steel, stainless steel, and other lightweight metals. In certain aspects, the housing can be painted or coated with bright, reflective paint so that it is readily viewable by oncoming traffic. In other aspects, the material of the housing is reflective.

Figure 3:
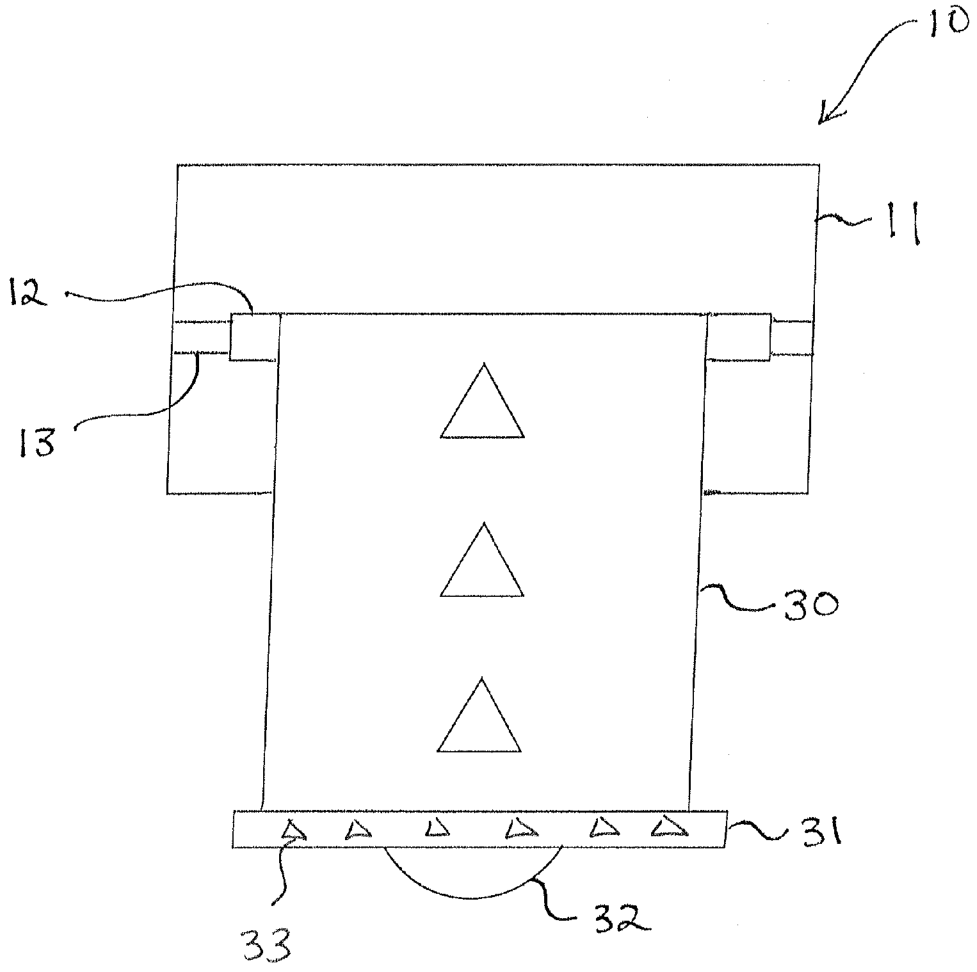
FIG. 3 shows a front view of the device with the warning sign extended from the housing, where the front side of the device is removed showing the inner mechanics of the device.

The warning sign is composed of a first end and second end. In one aspect, the first end of the warning sign is attached to the reel. This is depicted in FIG. 3, where the warning sign 30 is attached to the reel 12. The warning sign can be attached to the reel by a variety of techniques. For example, the warning sign can be attached to the reel by an adhesive, a plurality of screws or nails, or a combination thereof. Alternatively, the warning sign can be attached to reel by a plurality of snaps, which would permit the facile removal and replacement of the warning sign.

The warning sign can be composed of a lightweight, durable, water-resistant material. For example, the warning sign can be composed of natural fibers (e.g., cotton, wool) or synthetic polymers (e.g., vinyl, nylon, polyester). The warning sign can have a variety of different reflectors and warning signals. For example, the warning sign can have a plurality of reflective warning triangles. The warning sign can also have words such as “WARNING” and “CAUTION” on the sign composed of reflective materials and light emitting devices. The length and width of the warning sign 30 can vary depending upon local and state law requirements. The warning sign can be marked with distances so that oncoming traffic can be advised of the distance of the disabled vehicle or construction site when the warning sign is extended.

Figure 8:
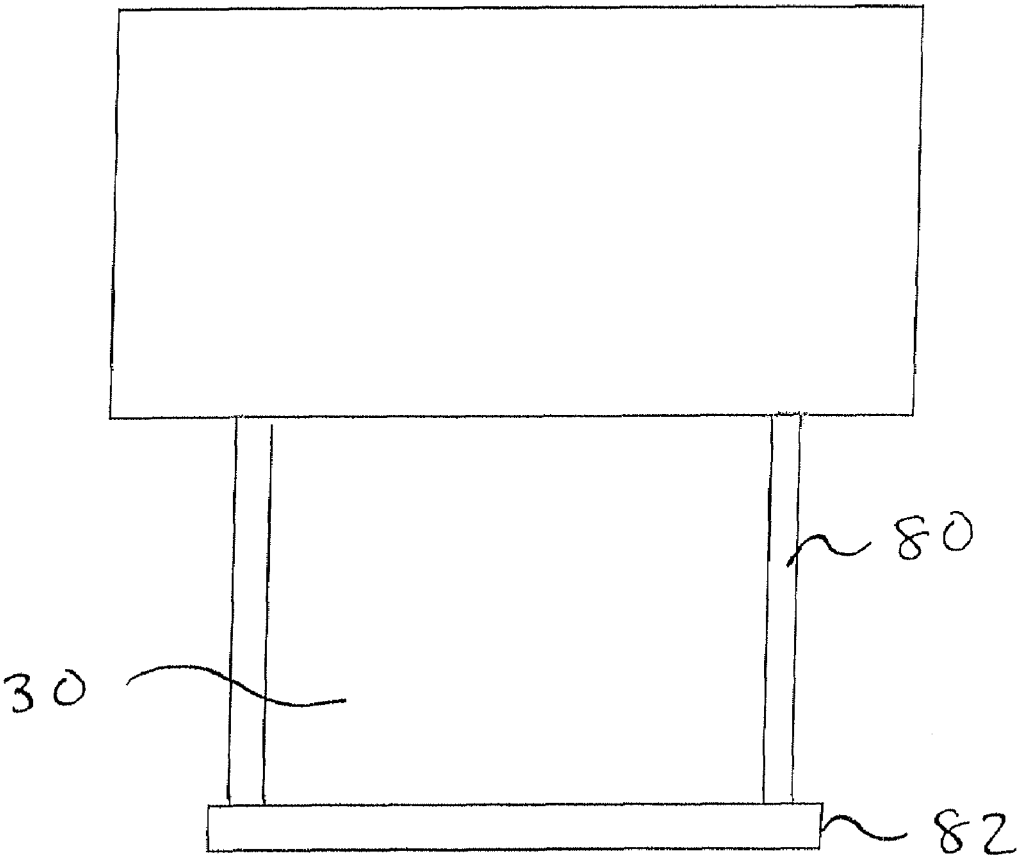
FIG. 8 shows the front view of the warning sign with sleeves for receiving a flexible rod.
Figure 9:
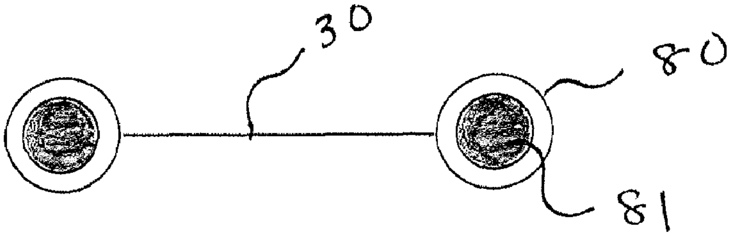
FIG. 9 shows the cross-sectional view of the warning sign with sleeves and flexible rod.
Figure 10:
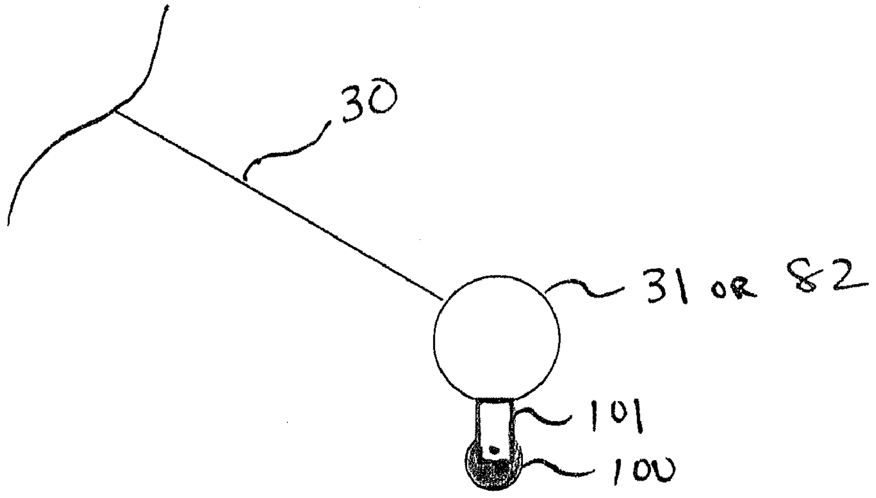
FIG. 10 shows the cross-sectional view of the weighted or unweighted rod with a wheel attached to the rod.
Figure 11:
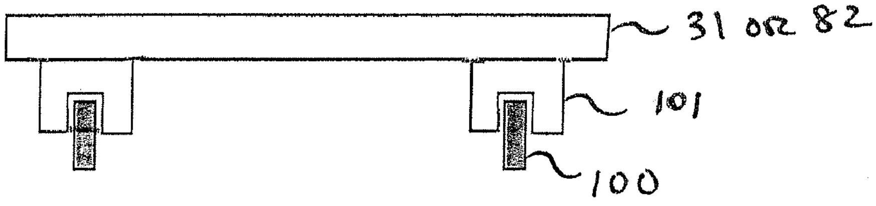
FIG. 11 shows the front view of the weighted or unweighted rod with wheels attached to the rod.

In certain aspects, the warning sign can be reinforced with a backing material that provides additional support to the warning sign yet readily permits the warning sign to be extended/retracted into the housing. In the alternative, the warning sign can be reinforced with one or more flexible rods. Referring to FIGS. 8 and 9, the edges of the warning sign have a sleeve 80 for receiving the flexible rod 81. The flexible rod can be made of any material that permits easy extension/retraction of the warning sign yet provide additional support to the warning sign when extended from the housing. In one aspect, the flexible rod is a telescoping rod that extends with the warning sign. In one aspect, the flexible rod is attached to rod 82 (weighted or unweighted).

Figure 4:
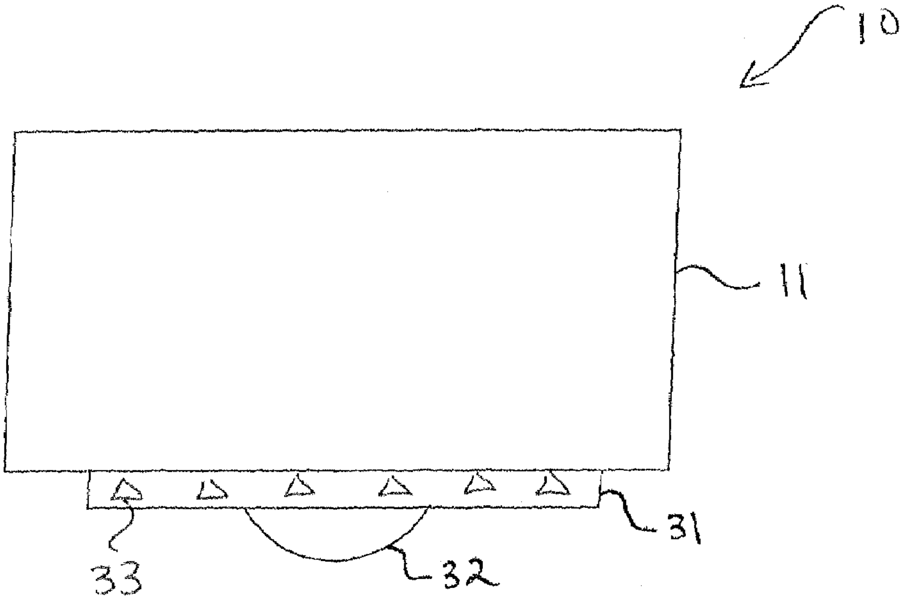
FIG. 4 shows a front view of the device, where the warning sign is in the retracted position.
Figure 5:
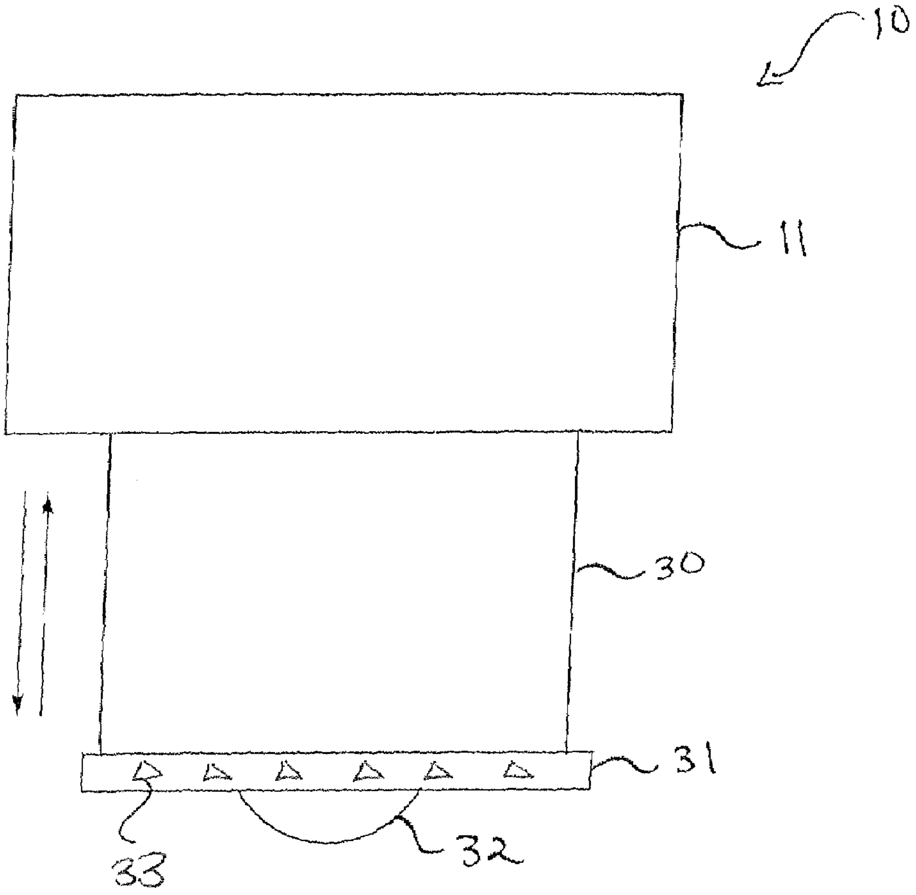
FIG. 5 shows a front view of the device, where the warning sign is in the extended position.

In one aspect, a weighted rod can be attached to the second end of the warning sign (e.g., the end not attached to the reel). Referring to FIGS. 3-5, the weighted rod 31 is attached to the end of the warning signal. The weight of the rod can vary depending upon the length of the warning sign. In certain aspects, the weight of the rod should be high enough to ensure that when the warning sign is fully extended from the housing, the warning sign is taut and not readily blown or moved by wind or oncoming traffic. The weighted rod can be made of any durable material such as, for example, steel or stainless steel. The weighted rod can have an optional handle 32 attached to the rod. In one aspect, the weighted rod can be painted with a reflective paint or have a plurality of reflectors attached to the rod.

In one aspect, a weighted rod can be attached to the second end of the warning sign (e.g., the end not attached to the reel). Referring to FIGS. 3-5, the weighted rod 31 is attached to the end of the warning signal. The weight of the rod can vary depending upon the length of the warning sign. In certain aspects, the weight of the rod should be high enough to ensure that when the warning sign is fully extended from the housing, the warning sign is taut and not readily blown or moved by wind or oncoming traffic. The weighted rod can be made of any durable material such as, for example, steel or stainless steel. The weighted rod can have an optional handle 32 attached to the rod. In one aspect, the weighted rod can be painted with a reflective paint or have a plurality of reflectors attached to the rod, which is depicted as 33 in FIGS. 3-5.

In one aspect, the safety warning system described herein is used to warn oncoming traffic of a disabled vehicle. In one aspect, the use of the device comprises (a) attaching the safety warning system to the vehicle;

(b) extending the warning sign from the system.

Figure 6:
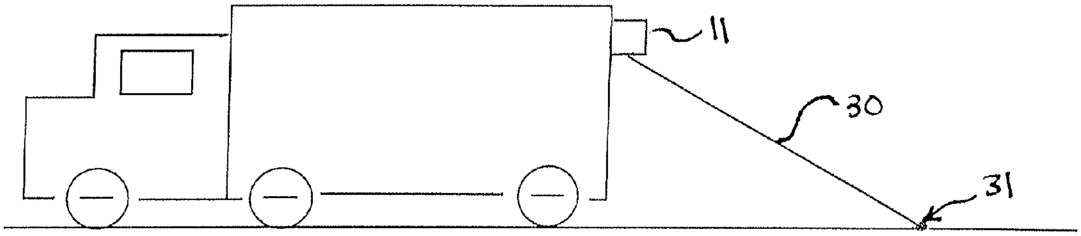
FIG. 6 shows the side view of a truck, where the device is mounted to the backside of the truck, and the warning sign is extended from the housing.
Figure 7:
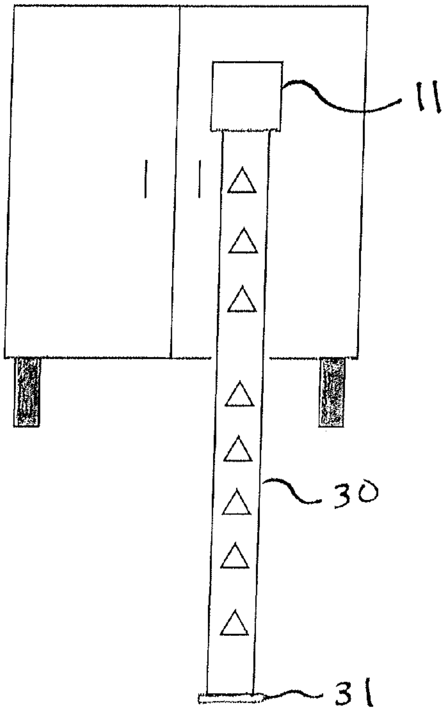
FIG. 7 shows the back view of a truck, where the device is mounted to the backside of the truck, and the warning sign is extended from the housing.

Depending upon the vehicle, the safety warning system can be permanently mounted to the vehicle or it can be a portable unit. For example, if the vehicle is a semi-truck, the safety warning system can be mounted on the back of the truck by way of fasteners, bolts and screws, and the like. This aspect is depicted in FIGS. 6 and 7. In the alternative, if the safety warning system is a portable unit, then the housing can have different means for attaching the device to the vehicle. For example, one or more magnets, suction cups, or hinges can be attached to the housing to permit attachment of the housing to the vehicle. If the vehicle is a car, the safety warning system can be mounted on top of the trunk or bumper. In the alternative, the safety warning system can be mounted on the underside of the trunk, wherein the driver of the car need only open the trunk and extend the warning sign from the safety system. It is contemplated that the safety warning system described herein can be used by emergency vehicles (e.g., police cars, fire trucks, ambulances, tow trucks, etc.). It is also contemplated that the safety warning system can be mounted on a boat or trailer being towed by the vehicle.

FIGS. 6 and 7 show one aspect for using the safety warning system. In this aspect, the safety warning system is mounted to the backside of the truck. The warning sign 30 is fully extended from the safety warning system and secured to the ground. If rod 31 is weighted, then the rod is placed to the ground once the warning sign is taut. In the alternative, the rod 31 can have one or more suction cups or fasteners (e.g., hooks) to attach and secure the rod to the ground. Once the driver is ready to depart, the warning sign can be retracted into the housing by the techniques described above. Using the techniques described above, the warning sign can be extended/retracted manually or automatically.

In another aspect, the warning sign can be attached to the vehicle once it has been extended from the housing. For example, when the warning system is mounted on the upper half of the back door of a semi-truck, the warning sign can be pulled down from the housing and attached to bumper of the truck. The rod attached to the second end of the warning sign can have one or more hooks to attach the warning sign to the bumper.

In one aspect, described herein is method for warning oncoming drivers of a construction site, comprising:

(a) attaching the safety warning system to a mount;

(b) extending the warning sign from system.

The safety warning system described herein can be attached to any type of mount typically used in road construction. For example, the safety warning system can be mounted to a cone, drum, pole, post, and the like. Construction sites are particularly hazardous to workers. Thus, the safety warning system described herein can be used to provide ample warning to oncoming traffic. For example, the width of the warning sign can be the width of the closed lane to prevent traffic from entering the lane. The length of the warning sign can also vary depending upon the amount of notice that needs to be provided to the oncoming traffic.

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed is:

1. A safety warning system, comprising:

a housing;

a warning sign comprising a first end and a second end, wherein the warning sign comprises one or more warning indicia;

a means for extending and retracting the warning sign from the housing wherein the means for extending and retracting the warning sign comprises a reel within the housing, wherein the first end of the warning sign is attached to the reel, and wherein the warning sign is wrapped around the reel when retracted; and one or more wheels are attached to the second end of the warning sign for extending the warning sign away from the housing.

2. The system of claim 1, further comprising a crank attached to the reel to retract the extended warning sign.

3. The system of claim 1, further comprising a motor to rotate the reel to retract or extend the warning sign from the housing.

4. The system of claim 3, wherein the motor can be operated remotely.

5. The system of claim 1, wherein the housing comprises a reflective material.

6. The system of claim 1, wherein the housing is coated with a reflective material.

7. A method for warning oncoming drivers of a disabled vehicle, comprising:

a. attaching the safety warning system of claim 1 to the vehicle;

b. extending the warning sign from the system away from the vehicle.

8. A method for warning oncoming drivers of a construction site, comprising:

a. attaching the safety warning system of claim 1 to a mount;

b. extending the warning sign from system away from the mount.

9. The system of claim 1, wherein the wheels are attached to the second end of the warning sign by a rod, wherein the rod is attached to the second end of the warning sign and the wheels are attached to the rod.

10. The system of claim 9, wherein the rod comprises one or more reflectors.

11. The system of claim 9, wherein the rod further comprises a handle.

12. The system of claim 1, wherein the warning sign comprises a sleeve at each edge of the sign for receiving a flexible rod and a flexible rod inserted within each sleeve.

13. The system of claim 1, wherein the warning sign is reinforced with a backing material.

* * * * *